US012164323B2

(12) United States Patent
Chauhan et al.

(10) Patent No.: US 12,164,323 B2
(45) Date of Patent: *Dec. 10, 2024

(54) TEMPERATURE DRIFT CORRECTION IN A VOLTAGE REFERENCE

(71) Applicant: Texas Instruments Incorporated, Dallas, TX (US)

(72) Inventors: Rajat Chauhan, Mahadevapura (IN); Sundeep Lakshmana Javvaji, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/833,474

(22) Filed: Jun. 6, 2022

(65) Prior Publication Data

US 2022/0390977 A1 Dec. 8, 2022

(30) Foreign Application Priority Data

Jun. 7, 2021 (IN) ............................ 202141025301

(51) Int. Cl.
*G05F 3/26* (2006.01)

(52) U.S. Cl.
CPC .................................. *G05F 3/262* (2013.01)

(58) Field of Classification Search
CPC ............................................ G05F 1/571–575
See application file for complete search history.

(56) References Cited

U.S. PATENT DOCUMENTS

| | | | |
|---|---|---|---|
| 8,378,739 B2 | 2/2013 | Notani et al. | |
| 2008/0082290 A1 | 4/2008 | Jeong et al. | |
| 2014/0266140 A1 | 9/2014 | Iriarte et al. | |
| 2018/0120876 A1 | 5/2018 | Petenyi | |
| 2020/0192414 A1* | 6/2020 | Mouret | G05F 3/267 |

FOREIGN PATENT DOCUMENTS

| | | | |
|---|---|---|---|
| WO | WO-2006098533 A1 * | 9/2006 | H03M 1/0619 |
| WO | WO-2016190112 A1 * | 12/2016 | G05F 1/56 |

OTHER PUBLICATIONS

International Search Report dated Sep. 20, 2022.

* cited by examiner

*Primary Examiner* — Peter M Novak
(74) *Attorney, Agent, or Firm* — Charles F. Koch; Frank D. Cimino

(57) ABSTRACT

In described examples, a circuit includes a current mirror circuit. A first stage is coupled to the current mirror circuit. A second stage is coupled to the current mirror circuit and to the first stage. An output transistor is coupled to the first stage and to the current mirror circuit. A voltage divider network is coupled to the output transistor, and a power source is coupled to the second stage and to the voltage divider network.

20 Claims, 6 Drawing Sheets

TEMPERATURE DRIFT CORRECTION IN A VOLTAGE REFERENCE

CROSS-REFERENCE TO RELATED APPLICATION

This application claims priority to India Provisional Patent Application No. 202141025301 filed Jun. 7, 2021, which is hereby incorporated by reference in its entirety.

TECHNICAL FIELD

This description relates generally to voltage reference circuits, and more particularly to a high precision voltage reference circuit with low noise.

BACKGROUND

A voltage reference circuit is useful in various integrated circuits, electronic devices and electronic systems that benefit from a stable voltage reference over a range of temperature and process variations. These voltage reference circuits are useful in many applications (such as environment sensing applications and medical applications) that measure relatively small or weak signals using higher resolution analog to digital converters (ADCs) that operate from an accurate and stable voltage source. Also, many of these applications include battery-powered, portable or remote devices, so low power consumption is important. Accordingly, a voltage reference circuit can benefit from relatively low quiescent current.

SUMMARY

In described examples, a circuit includes a current mirror circuit. A first stage is coupled to the current mirror circuit. A second stage is coupled to the current mirror circuit and to the first stage. An output transistor is coupled to the first stage and to the current mirror circuit. A voltage divider network is coupled to the output transistor, and a power source is coupled to the second stage and to the voltage divider network

DETAILED DESCRIPTION OF EXAMPLE EMBODIMENTS

Figure 1:
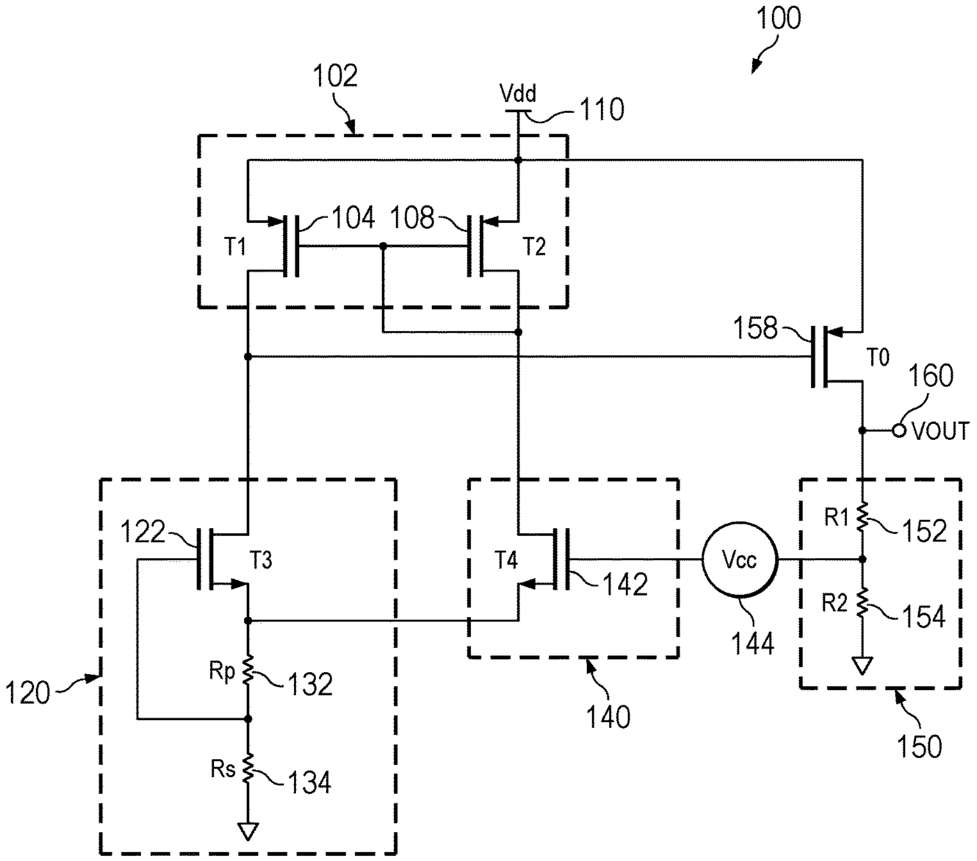
FIG. 1 is a schematic of a circuit, according to an embodiment.

FIG. 1 is a schematic of a circuit 100, according to an embodiment. The circuit 100 includes a current mirror circuit 102, a first stage 120, a second stage 140, a power source 144, a voltage divider network 150 and an output transistor T0 158. The current mirror circuit 102 is coupled to a power input terminal Vdd 110. The power input terminal Vdd 110 receives the power supply. The first stage 120 and the second stage 140 are coupled to the current mirror circuit 102. The first stage 120 is also coupled to the second stage 140. The output transistor T0 158 is coupled to the current mirror circuit 102 and to the first stage 120. The power source 144 is coupled to the second stage 140 and the voltage divider network 150.

The first stage 120 includes a third transistor T3 122. The second stage 140 includes a fourth transistor T4 142. In one version, both the first stage 120 and the second stage 140 include multiple transistors. The current mirror circuit 102 includes a first transistor T1 104 and a second transistor T2 108. A source terminal of the first transistor T1 104 is coupled to the power input terminal Vdd 110, and a drain terminal of the first transistor T1 104 is coupled to the third transistor T3 122. A gate terminal of the first transistor T1 104 is coupled to a gate terminal of the second transistor T2 108.

A source terminal of the second transistor T2 108 is coupled to the power input terminal Vdd 110, and a drain terminal of the second transistor T2 108 is coupled to the fourth transistor T4 142. A gate terminal of the second transistor T2 108 is coupled to the gate terminal of the first transistor T1 104 and to the drain terminal of the second transistor T2 108. For the third transistor T3 122, its drain terminal is coupled to the first transistor T1 104 in the current mirror circuit 102, and its source terminal is coupled to a first end of a primary resistor Rp 132. The source terminal of the third transistor T3 122 is also coupled to the fourth transistor T4 142 in the second stage 140. A second end of the primary resistor Rp 132 is coupled to the gate terminal of the third transistor T3 122. Thus, the primary resistor Rp 132 is coupled between the source terminal of the third transistor T3 122 and the gate terminal of the third transistor T3 122.

A secondary resistor Rs 134, having first and second ends, is coupled to the primary resistor Rp 132. The first end of the secondary resistor Rs 134 is coupled to the second end of the primary resistor Rp 132. The second end of the secondary resistor Rs 134 is coupled to a ground terminal. In one example, in the circuit 100, a source terminal of a transistor is a first terminal, a drain terminal of the transistor is a second terminal, and a gate terminal of the transistor is a third terminal.

A drain terminal of the fourth transistor T4 142 is coupled to the second transistor T2 108 in the current mirror circuit 102, and a gate terminal of the fourth transistor T4 142 is coupled to the power source 144. A source terminal of the fourth transistor T4 142 is coupled to a source terminal of the third transistor T3 122.

The output transistor T0 158 is coupled to the first stage 120, the current mirror circuit 102 and the voltage divider network 150. A gate terminal of the output transistor T0 158 is coupled to the drain terminal of the third transistor T3 122 in the first stage 120 and to the drain terminal of the first transistor T1 104 in the current mirror circuit 102. A source terminal of the output transistor T0 158 is coupled to the power input terminal Vdd 110. A drain terminal of the output transistor T0 158 is coupled to the voltage divider network 150.

The voltage divider network 150 includes a first resistor R1 152 and a second resistor R2 154. A first end of the first resistor R1 152 is coupled to the drain terminal of the output transistor T0 158, and a second end of the first resistor R1 152 is coupled to the second resistor R2 154 and to the power source 144. A first end of the second resistor R2 154 is coupled to the first resistor R1 152 and to the power source 144. A second end of the second resistor R2 154 is coupled to the ground terminal.

The circuit 100 may include one or more conventional components that are not described herein for brevity. Each component of the circuit 100 may also be coupled to other components or blocks in FIG. 1, but those connections are not described herein for brevity. Also, each block or component of FIG. 1 may be coupled to conventional components of a system using the circuit 100, which are also not shown in FIG. 1 for brevity.

In operation, the configuration of the current mirror circuit 102 causes a current at the drain terminal of the first transistor T1 104 to be mirrored at the drain terminal of the second transistor T2 108. Accordingly, the current at the drain terminal of the first transistor T1 104 is substantially the same as the current at the drain terminal of the second transistor T2 108. In this example: (a) the first transistor T1 104, the second transistor T2 108 and the output transistor T0 158 are PFETs; and (b) the third transistor T3 122 and the fourth transistor T4 142 are NFETs.

In one version, the third transistor T3 122 is a natural voltage threshold transistors (NVTs), having a negative voltage threshold. The negative voltage threshold, in one example, is within +1-10% of −100 mV. In yet another version, the fourth transistor T4 142 is a standard voltage threshold transistor with a positive voltage threshold. The positive voltage threshold, in one example, is within +/−10% of +600 millivolts (mV).

The third transistor T3 122 and the fourth transistor T4 142 form a voltage generation circuit. The first transistor T1 104, the second transistor T2 108, the third transistor T3 122, and the fourth transistor T4 142 form a differential amplifier stage. The output transistor T0 158 and the voltage divider network 150 form a scaling amplifier stage. The first transistor T1 104 and the second transistor T2 108 function as load transistors, while the third transistor T3 122 and the fourth transistor T4 142 function as input transistors, for the differential amplifier stage. At an output of this differential amplifier stage, a control signal is provided to the gate terminal of the output transistor T0 158. An output voltage Vout 160 is generated at the drain terminal of the output transistor T0 158. The output voltage Vout 160 is provided as a feedback to the differential amplifier stage at the gate terminal of the fourth transistor T4 142 through the power source 144.

The output voltage Vout 160 is a sum of a voltage (VsgNAT) across the primary resistor Rp 132, a voltage (Vptat) across the secondary resistor Rs 134, a gate-to-source voltage (VgsSVT) across the fourth transistor T4 142, a correction voltage Vcc across the power source 144, and a voltage (Vscale) across the first resistor R1 152. The output voltage Vout 160 is expressed as:

$$V_{out}=V_{sgNAT}+V_{ptat}+V_{gsSVT}+V_{cc}+V_{scale} \tag{1}$$

The voltage (VsgNAT) generated across the primary resistor Rp 132 is a first reference voltage, and the voltage (Vptat) generated across the secondary resistor Rs 134 is a second reference voltage. The voltage (VgsSVT) generated across the fourth transistor T4 142 is a third reference voltage. The voltage (Vscale) generated across the first resistor R1 152 in the voltage divider network 150 is a fourth reference voltage. In one version, the third reference voltage is greater than the first reference voltage. As shown in equation (1), the output voltage Vout 160 is a function of the first reference voltage (VsgNAT), the second reference voltage (Vptat), the third reference voltage (VgsSVT), the correction voltage (Vcc) and the fourth reference voltage (Vscale). In another version, when the first and the second stage include multiple transistors, a sum of thresholds of transistors in the second stage 140 is greater than a sum of thresholds of transistors in the first stage 120.

A difference between the gate-to-source voltage (VgsSVT) across the fourth transistor T4 142 and the voltage (VsgNAT) across the primary resistor Rp 132 is defined as a voltage threshold gap (VTgap), and can be expressed as sum of VsgNAT and VgsSVT. Accordingly, equation (1) can be expressed as:

$$V_{out}=VT_{gap}+V_{ptat}+V_{cc}+V_{scale} \tag{2}$$

Also, the voltage (Vscale) across the first resistor R1 152 is expressed as:

$$V_{scale}=(VT_{gap}+V_{ptat}+V_{cc})*\left(\frac{R1}{R2}\right) \tag{3}$$

Using equations (2) and (3), the output voltage Vout 160 can be expressed as:

$$V_{out}=(VT_{gap}+V_{ptat}+V_{cc})*\left(1+\frac{R1}{R2}\right) \tag{4}$$

The voltage (Vptat) across the secondary resistor Rs 134 is expressed as:

$$V_{ptat}=(V_{sgNAT})*\left(\frac{Rs}{Rp}\right) \tag{5}$$

Using equation (5), the output voltage Vout 160 can be expressed as:

$$V_{out}=\left(VT_{gap}+V_{SgNAT}*\left(\frac{Rs}{Rp}\right)+V_{cc}\right)*\left(1+\frac{R1}{R2}\right) \tag{6}$$

VTgap is a difference in threshold voltages of the fourth transistor T4 142 and the third transistor T3 122, and is generally in a range of 0.6V to 0.9V. Thus, the circuit 100 achieves higher level of output voltage Vout 160 without increasing noise in the output voltage Vout 160. The scaling of the first resistor R1 152 and the second resistor R2 154 is not required for higher output voltage Vout 160, which otherwise causes high thermal noise. The power source 144 generates the correction voltage Vcc that is proportional to a factor of temperature. In one example, the power source 144 generates the correction voltage Vcc that is proportional to temperature squared. Thus, the power source 144 effectively cancels a second order temperature drift in the output voltage Vout 160. The voltage (Vptat) generated across the secondary resistors Rs 134 controls a first order temperature drift in the output voltage Vout 160.

If the circuit 100 omits the power source 144, then the output voltage Vout 160 includes higher order temperature drifts. The power source 144 generates the correction voltage Vcc having equal but opposite higher order temperature drifts. Thus, when power source 144 is added to the circuit 100 of FIG. 1, the correction voltage Vcc cancels the temperature drifts in the output voltage Vout 160. In one example, before the corrected voltage (after temperature drift removal) is generated as the output voltage Vout 160, the corrected voltage undergoes trimming for first order temperature slope and for accuracy. The first order temperature slope is linear variation of the output voltage Vout 160 with temperature, and this variation is adjusted by trimming the secondary resistor Rs 134. The accuracy is an expected output voltage Vout 160 at room temperature, and this is adjusted by trimming the first resistor R1 152.

At higher temperatures, the output voltage Vout 160 has an inverse curvature. The power source 144 is able to address this inverse curvature issue as well. The power source 144 includes a first generator, a second generator and a converter circuit. The first generator generates a current that is inverse of curvature realized in the output voltage Vout 160 at higher temperatures. This makes the circuit 100 useful as a voltage reference circuit. The circuit 100 is useful as a voltage reference circuit in applications where small sensed signals require very high resolution, because such circuits require precise output voltage Vout 160 with low noise. Also, the circuit 100 achieves lower noise without increase in quiescent current, and accordingly is useful in portable or battery powered applications, because such circuits have more stringent quiescent current requirement along with requirements of low noise.

The circuit 100 is useful as a voltage reference circuit in applications that require higher accuracy over a broad range of temperatures. Applications such as environmental sensors and medical applications can use circuit 100 as a voltage reference, because it provides low temperature drift even at higher temperatures and accordingly increases accuracy of such systems. The ultra-low power consumption of circuit 100 makes it useful in battery powered applications. The low noise feature of circuit 100 makes it useful in precision signal chain applications. The circuit 100 is useful in multiple systems, such as field transmitters, fault indicators, infusion pumps, optical modules and ADAS (advanced driver assistance systems).

Figure 2:
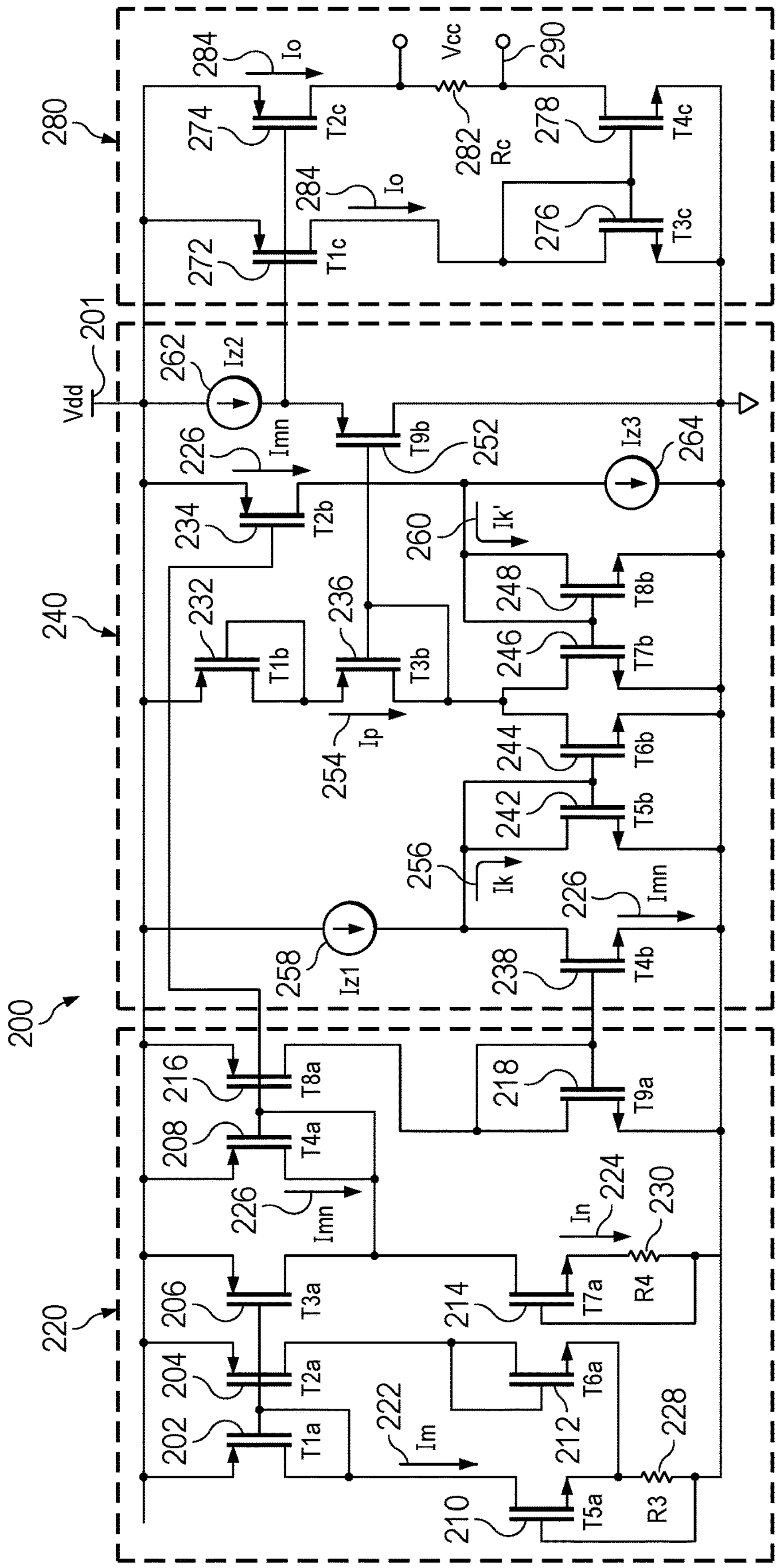
FIG. 2 is a schematic of a power source, according to an embodiment.

FIG. 2 illustrate a schematic of a power source 200, according to an embodiment. The power source 200 is similar, in connection and operation, to the power source 144 of FIG. 1. The power source 200 includes a first generator 220, a second generator 240 and a converter circuit 280. The second generator 240 is coupled to the first generator 220, and the converter circuit 280 is coupled to the second generator 240.

The first generator 220 includes an alpha first current mirror circuit, an alpha first stage, an alpha second stage, an alpha second current mirror circuit, an alpha seventh transistor T7*a* 214, and an alpha ninth transistor T9*a* 218. The alpha first current mirror circuit includes an alpha first transistor T1*a* 202, an alpha second transistor T2*a* 204 and an alpha third transistor T3*a* 206. The alpha second current mirror circuit includes an alpha fourth transistor T4*a* 208 and an alpha eight transistor T8*a* 216. The alpha first stage includes an alpha fifth transistor T5*a* 210. The alpha second stage includes an alpha sixth transistor T6*a* 212. In one version, both the alpha first stage and the alpha second stage include multiple transistors.

The alpha first current mirror circuit is coupled to a power input terminal Vdd 201. The power input terminal Vdd 201 receives a power supply. The alpha first current mirror circuit includes the alpha first transistor T1*a* 202, the alpha second transistor T2*a* 204 and the alpha third transistor T3*a* 206. A source terminal of each of the alpha first transistor T1*a* 202, the alpha second transistor T2*a* 204 and the alpha third transistor T3*a* 206 is coupled to the power input terminal Vdd 201. A drain terminal of the alpha first transistor T1*a* 202 is coupled to the alpha fifth transistor T5*a* 210 in the first stage. A drain terminal of the alpha second transistor T2*a* 204 is coupled to the alpha sixth transistor T6*a* 212 in the second stage. A drain terminal of the alpha third transistor T3*a* 206 is coupled to the alpha seventh transistor T7*a* 214. A gate terminal of the alpha first transistor T1*a* 202 is coupled to gate terminals of the alpha second transistor T1*a* 204 and the alpha third transistor T3*a* 206. The gate terminal of the alpha first transistor T1*a* 202 is also coupled to the drain terminal of the alpha first transistor T1*a* 202.

A drain terminal of the alpha fifth transistor T5*a* 210 is coupled to the drain terminal of the alpha first transistor T1*a* 202. A source terminal of the alpha fifth transistor T5*a* 210 is coupled to the second stage and to a first end of a third resistor R3 228. A gate terminal of the alpha fifth transistor T5*a* 210 is coupled to a second end of the third resistor R3 228. The second end of the third resistor R3 228 is coupled to a ground terminal. In one example, the second end of the third resistor R3 228 is coupled to a secondary voltage source.

A drain terminal of the alpha sixth transistor T6*a* 212 is coupled to the drain terminal of the alpha second transistor T2*a* 204. A source terminal of the alpha sixth transistor T6*a* 212 is coupled to the first stage and to the first end of the third resistor R3 228. A gate terminal of the alpha sixth transistor T6*a* 212 is coupled to the drain terminal of the alpha sixth transistor T6*a* 212.

The alpha second current mirror circuit includes the alpha fourth transistor T4*a* 208 and the alpha eight transistor T8*a* 216. A source terminal of each of the alpha fourth transistor T4*a* 208 and the alpha eight transistor T8*a* 216 is coupled to the power input terminal Vdd 201. A drain terminal of the alpha fourth transistor T4*a* 208 is coupled to the drain terminal of the alpha third transistor T3*a* 206. A drain terminal of the alpha eight transistor T8*a* 216 is coupled to the alpha ninth transistor T9*a* 218. A gate terminal of each of the alpha fourth transistor T4*a* 208 and the alpha eight transistor T8*a* 216 is coupled to each other and to the drain terminal of the alpha fourth transistor T4*a* 208.

A drain terminal of the alpha seventh transistor T7*a* 214 is coupled to the drain terminal of the alpha third transistor T3*a* 206. A source terminal of the alpha seventh transistor T7*a* 214 is coupled to a first end of a fourth resistor R4 230. A gate terminal of the alpha seventh transistor T7*a* 214 is coupled to a second end of the fourth resistor R4 230. The second end of the fourth resistor R4 230 is coupled to the ground terminal. In one example, the second end of the fourth resistor R4 230 is coupled to the secondary voltage source.

A drain terminal of the alpha ninth transistor T9*a* 218 is coupled to the drain terminal of the alpha eighth transistor T8*a* 216. A source terminal of the alpha ninth transistor T9*a* 218 is coupled to the ground terminal. A gate terminal of the alpha ninth transistor T9*a* 218 is coupled to the drain terminal of the alpha ninth transistor T9*a* 218 and to the second generator 240.

The second generator 240 includes a first current source 258, a second current source 262, a third current source 264, a beta first transistor T1*b* 232, a beta second transistor T2*b* 234, a beta third transistor T3*b* 236, a beta fourth transistor T4*b* 238, a beta first current mirror circuit, a beta second current mirror circuit, and a beta ninth transistor T9*b* 252. The beta first current mirror circuit includes a beta fifth transistor T5*b* 242 and a beta sixth transistor T6*b* 244. The beta second current mirror circuit includes a beta seventh transistor T7*b* 246 and a beta eighth transistor T8*b* 248.

The first current source 258 is coupled to the power input terminal Vdd 201. A source terminal of the beta first transistor T1*b* 232 is coupled to the power input terminal Vdd 201. A drain terminal of the beta first transistor T1*b* 232 is coupled to the beta third transistor T3*b* 236. A gate terminal of the beta first transistor T1*b* 232 is coupled to the drain terminal of the beta first transistor T1*b* 232.

A source terminal of the beta second transistor T2*b* 234 is coupled to the power input terminal Vdd 201. A drain terminal of the beta second transistor T2*b* 234 is coupled to the third current source 264 and to the beta second current mirror circuit. A gate terminal of the beta second transistor T2*b* 234 is coupled to the gate terminals of the alpha fourth transistor T4*a* 208 and the alpha eighth transistor T8*a* 216.

A source terminal of the beta third transistor T3*b* 236 is coupled to the drain terminal of beta first transistor T1*b* 232. A drain terminal of the beta third transistor T3*b* 236 is coupled to the beta first current mirror circuit and to the beta second current mirror circuit. A gate terminal of the beta third transistor T3*b* 236 is coupled to the drain terminal of the beta third transistor T3*b* 236.

A source terminal of the beta fourth transistor T4*b* 238 is coupled to the ground terminal. A drain terminal of the beta fourth transistor T4*b* 238 is coupled to the first current source 258 and to the beta first current mirror circuit. A gate terminal of the beta fourth transistor T4*b* 238 is coupled to the gate terminal of the alpha ninth transistor T9*a* 218 in the first generator 220.

The beta first current mirror circuit includes the beta fifth transistor T5*b* 242 and the beta sixth transistor T6*b* 244. A source terminal of each of the beta fifth transistor T5*b* 242 and the beta sixth transistor T6*b* 244 is coupled to the ground terminal. A drain terminal of the beta fifth transistor T5*b* 242 is coupled to the first current source 258. A drain terminal of the beta sixth transistor T6*b* 244 is coupled to the beta third transistor T3*b* 236 and to the beta second current mirror circuit. A gate terminal of the beta fifth transistor T5*b* 242 is coupled to a gate terminal of the beta sixth transistor T6*b* 244. The gate terminal of the beta fifth transistor T5*b* 242 is also coupled to the drain terminal of beta fifth transistor T5*b* 242.

The beta second current mirror circuit includes the beta seventh transistor T7*b* 246 and the beta eighth transistor T8*b* 248. A source terminal of each of the beta seventh transistor T7*b* 246 and the beta eighth transistor T8*b* 248 is coupled to the ground terminal. A drain terminal of the beta seventh transistor T7*b* 246 is coupled to the beta third transistor T3*b* 236 and to the beta first current mirror circuit. A drain terminal of the beta eighth transistor T8*b* 248 is coupled to the beta second transistor T2*b* 234 and to the third current source 264. A gate terminal of the beta seventh transistor T7*b* 246 is coupled to a gate terminal of the beta eighth transistor T8*b* 248. The gate terminal of the beta eighth transistor T8*b* 248 is also coupled to the drain terminal of beta eighth transistor T8*b* 248.

The second current source 262 is coupled to the power input terminal Vdd 201. A source terminal of the beta ninth transistor T9*b* 252 is coupled to the second current source 262. A drain terminal of the beta ninth transistor T9*b* 252 is coupled to the ground terminal. A gate terminal of the beta ninth transistor T9*b* 252 is coupled to the gate terminal of the beta third transistor T3*b* 236. One end of the third current source 264 is coupled to the ground terminal.

The converter circuit 280 includes a gamma first transistor T1*c* 272, a gamma second transistor T2*c* 274, a gamma current mirror circuit, and a tertiary resistor Rc 282. The gamma current mirror circuit includes a gamma third transistor T3*c* 276 and a gamma fourth transistor T4*c* 278.

A source terminal of the gamma first transistor T1*c* 272 is coupled to the power input terminal Vdd 201. A drain terminal of the gamma first transistor T1*c* 272 is coupled to the gamma current mirror circuit. A gate terminal of the gamma first transistor T1*c* 272 is coupled to the second current source 262 and to the source terminal of the beta ninth transistor T9*b* 252.

A source terminal of the gamma second transistor T2*c* 274 is coupled to the power input terminal Vdd 201. A drain terminal of the gamma second transistor T2*c* 274 is coupled to a first end of the tertiary resistor Rc 282. A gate terminal of the gamma second transistor T2*c* 274 is coupled to the second current source 262 and to the source terminal of the beta ninth transistor T9*b* 252.

The gamma current mirror circuit includes the gamma third transistor T3*c* 276 and the gamma fourth transistor T4*c* 278. A source terminal of each of the gamma third transistor T3*c* 276 and the gamma fourth transistor T4*c* 278 is coupled to the ground terminal. A drain terminal of the gamma third transistor T3*c* 276 is coupled to the drain terminal of the gamma first transistor T1*c* 272. A drain terminal of the gamma fourth transistor T4*c* 278 is coupled to a second end of the tertiary resistor Rc 282. A gate terminal of the gamma third transistor T3*c* 276 is coupled to a gate terminal of the gamma fourth transistor T4*c* 278. The gate terminal of the gamma third transistor T3*c* 276 is also coupled to the drain terminal of the gamma third transistor T3*c* 276. The tertiary resistor Rc 282 is coupled to the gamma second transistor T2*c* 274 and to the gamma current mirror circuit.

The power source 200 may include one or more conventional components that are not described herein for brevity. Each component of the power source 200 may also be coupled to other components or blocks in FIG. 2, but those connections are not described herein for brevity. Also, each block or component of FIG. 2 may be coupled to conventional components of a system using the power source 200, which are also not shown in FIG. 2 for brevity.

In operation, the configuration of a current mirror circuit (having first and second transistors) causes a current at a drain terminal of the first transistor to be mirrored at a drain terminal of the second transistor. Accordingly, the current at the drain terminal of the alpha first transistor T1*a* 202 is a primary current Im 222. This is substantially the same as the current at the drain terminal of the alpha second transistor T2*a* 204 and the alpha third transistor T3*a* 206.

The alpha first transistor T1*a* 202, the alpha second transistor T2*a* 204, the alpha third transistor T3*a* 206, the alpha fourth transistor T4*a* 208 and the alpha eight transistor T8*a* 216 are p-channel field effect transistors (PFETs). The alpha fifth transistor T5*a* 210, the alpha sixth transistor T6*a* 212, the alpha seventh transistor T7*a* 214, and the alpha ninth transistor T9*a* 218 are n-channel field effect transistors (NFETs).

The current at the source terminal of the alpha seventh transistor T7*a* 214 is a secondary current In 224. The secondary current In 224 varies proportional to variation in temperature. Accordingly, the current at the drain terminal of alpha fourth transistor T4*a* 208 is a first current Imn 226 that is substantially the same as the current at the drain terminal of the alpha eighth transistor T8*a* 216. Thus, the current at the drain terminal of the alpha ninth transistor T9*a* 218 is the first current Imn 226. The first current Imn 226 can be expressed as:

$$I_{mn}=I_n-I_m \quad (7)$$

The alpha ninth transistor T9*a* 218 and the beta fourth transistor T4*b* 238 form a current mirror circuit. Accordingly, the current at the drain terminal of the alpha ninth transistor T9*a* 218 is the first current Imn 226, which is substantially the same as the current at the drain terminal of the beta fourth transistor T4*b* 238.

The first generator 220 provides the first current Imn 226 to the second generator 240. The alpha fourth transistor T4*a* 208, the alpha eighth transistor T8*a* 216 and the beta second transistor T2*b* 234 form a current mirror circuit. Thus, the current at the drain terminal of the beta second transistor T2*b* 234 is the first current Imn 226.

A current through the drain terminal of the beta fifth transistor T5*b* 242 is a tertiary current Ik 256. A current through the drain terminal of the beta eighth transistor T8*b* is a quaternary current Ik' 260. The tertiary current Ik 256 and the quaternary current Ik' 260 can be expressed as:

$$I_k = I_{z1} - I_{mn} \quad (8)$$

$$I_k' = I_{mn} - I_{z3} \quad (9)$$

where Iz1 is current through the first current source 258, and Iz3 is current through the third current source 264. In one version, Iz1 is equal to Iz3. In another version, Iz1 and Iz3 are equal, and both of them are equal to Iz2, which is the current generated by the second current source 262. In yet another version, Iz1 and Iz3 are equal to each other, but not equal to Iz2.

An input current Ip 254 at the drain terminal of the beta first transistor T1*b* is proportional to the tertiary current Ik 256 before temperature is equal to knee temperature. The input current Ip 254 is proportional to the quaternary current Ik' 260 after temperature crosses knee temperature. The knee temperature is a temperature at which the input current Ip 254 changes temperature dependence. At knee temperature, the first current Imn 226 crosses over the Iz1 and Iz3 currents. In one example, the knee temperature is fixed for a device using the power source 200. In another example, the first current Imn 226 and Iz1 define the knee temperature, and trimming bits are used to modulate the knee temperature. In yet another example, the knee temperature is substantially the same as room temperature. In both conditions, the input current Ip 254 is proportional to temperature because of its dependence on the secondary current In 224. This also enables the power source 200 to have minimal impact (at room temperature) on the overall noise associated with the output voltage Vout 160 when used in a voltage reference circuit, such as circuit 100 of FIG. 1.

The input current Ip 254 is provided by the second generator 240 to the converter circuit 280. A current at the drain terminal of the gamma first transistor T1*c* 272 is a correction current Io 284. The current at the drain terminal of the gamma second transistor T2*c* 274 is the correction current Io 284. Thus, the current through the tertiary resistor Rc 282 is the correction current Io 284. The correction current Io 284 can be expressed as:

$$I_o = (I_p)^2 * \left(\frac{1}{Iz2}\right) \quad (10)$$

Thus, the correction current Io 284 is proportional to square of the input current Ip 254, and therefore proportional to square of temperature. A voltage generated across the tertiary resistor Rc 282 is a correction voltage Vcc 290. The correction voltage Vcc 290 is generated as a result of the correction current Io 284 through the tertiary resistor Rc 282. Thus, the correction voltage Vcc 290 is also proportional to square of temperature.

Thus, the power source 200 generates the correction voltage Vcc 290 which when used in the circuit 100 cancels the second order and higher order temperature drifts in the output voltage Vout 160. The power source 200 generates the correction voltage Vcc 290 having equal but opposite higher order temperature drifts. At higher temperatures, the output voltage Vout 160 has an inverse curvature. The power source 200 is able to address this inverse curvature as the first generator 220 generates the first current Imn 226 that is inverse of curvature realized in the output voltage Vout 160 at higher temperatures. Thus, the first generator 220 provides high temperature curvature correction. This makes the circuit 100 useful as a voltage reference circuit. The power source 200 allows the circuit 100 to be used as a voltage reference circuit in applications where small sensed signals require very high resolution, because such circuits require precise output voltage Vout 160 with low noise. Also, the power source 200 enables the circuit 100 to achieve lower noise without increase in quiescent current, and accordingly finds application in portable or battery powered circuits, because such circuits have more stringent quiescent current requirement along with requirements of low noise.

The power source 200 avoids any requirement of a separate circuit to address the second and higher order temperature drift correction in the output voltage Vout 160. The power source 200 tracks process variations. In addition, the power source 200 has minimal impact on noise performance of the circuit 100, and consumes ultra-low current. This is enabled by the first generator 220 used in the power source 200. If the first generator 220 is not used in the power source 200 for higher temperature curvature correction, then either the width of the third transistor T3 122 (in FIG. 1) is to be reduced (which increases noise) or a resistance of the primary resistor Rp 132 is to be reduced (which increases the quiescent current of the circuit 100). Applications such as environmental sensors and medical applications can use circuit 100 (with power source 200) as a voltage reference, because it provides low temperature drift even at higher temperatures and accordingly increases accuracy of such systems across a temperature range.

Figure 3:
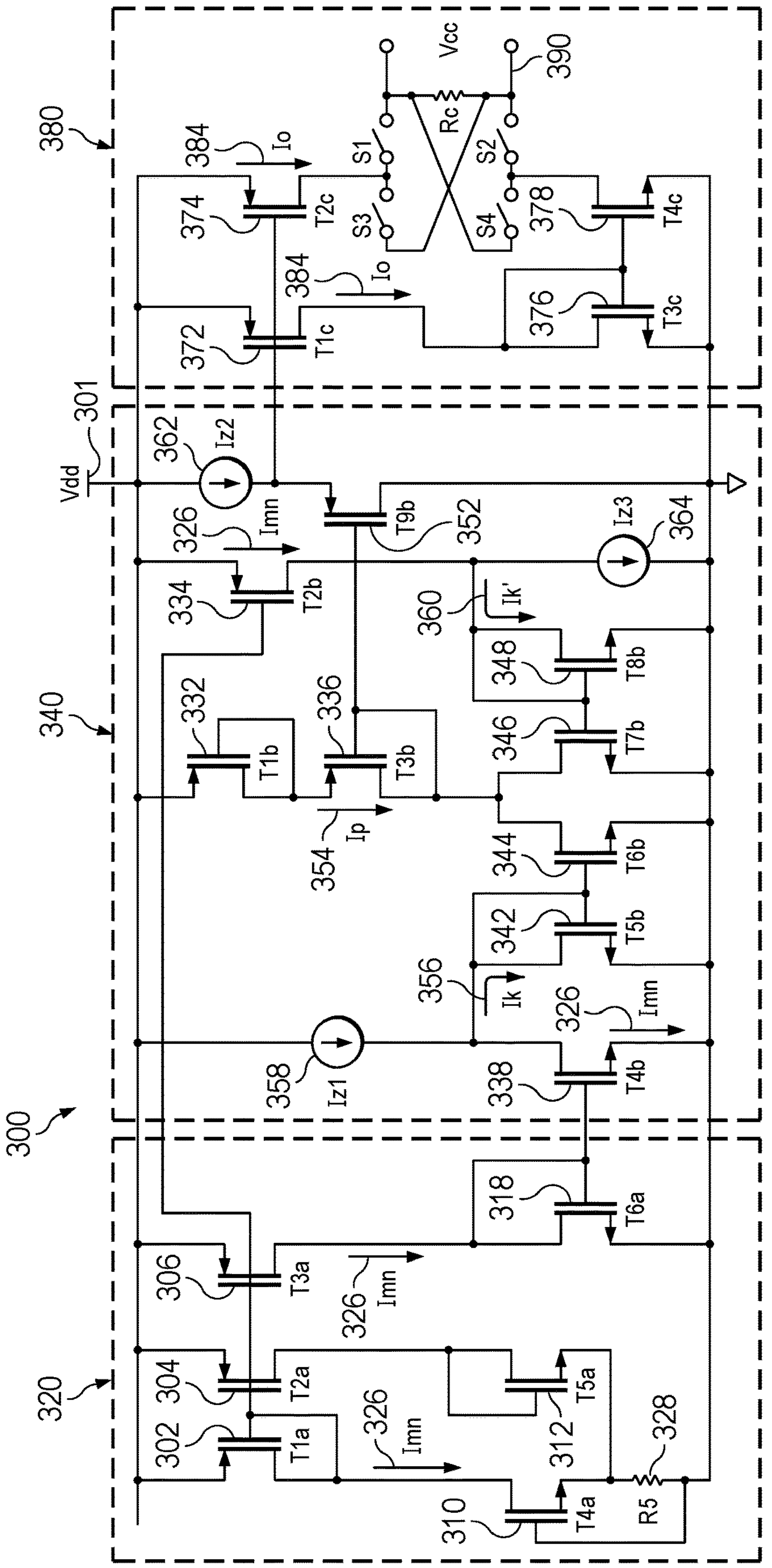
FIG. 3 is a schematic of a power source, according to an embodiment.

FIG. 3 illustrate a schematic of a power source 300, according to an embodiment. The power source 300 is similar, in connection and operation, to the power source 144 of FIG. 1. The power source 300 includes a first generator 320, a second generator 340 and a converter circuit 380. The second generator 340 is coupled to the first generator 320, and the converter circuit 380 is coupled to the second generator 340.

The first generator 320 includes a delta first current mirror circuit, a delta first stage, a delta second stage, and a delta sixth transistor T6*a* 318. The delta first current mirror circuit includes a delta first transistor T1*a* 302, a delta second transistor T2*a* 304 and a delta third transistor T3*a* 306. The delta first stage includes a delta fourth transistor T4*a* 310. The delta second stage includes a delta fifth transistor T5*a* 312. In one version, both the delta first stage and the delta second stage include multiple transistors.

The delta first current mirror circuit is coupled to a power input terminal Vdd 301. The power input terminal Vdd 301 receives a power supply. The delta first current mirror circuit includes the delta first transistor T1*a* 302, the delta second transistor T2*a* 304 and the delta third transistor T3*a* 306. A source terminal of each of the delta first transistor T1*a* 302, the delta second transistor T2*a* 304 and the delta third transistor T3*a* 306 is coupled to the power input terminal Vdd 301. A drain terminal of the delta first transistor T1*a* 302 is coupled to the delta fourth transistor T4*a* 310 in the first stage. A drain terminal of the delta second transistor T2*a* 304 is coupled to the delta fifth transistor T5*a* 312 in the second stage. A drain terminal of the delta third transistor T3*a* 306 is coupled to the delta sixth transistor T6*a* 318. A gate terminal of the delta first transistor T1*a* 302 is coupled to gate terminals of the delta second transistor T1*a* 304 and the delta third transistor T3*a* 306. The gate terminal of the delta first transistor T1*a* 302 is also coupled to the drain terminal of the delta first transistor T1*a* 302.

A drain terminal of the delta fourth transistor T4*a* 310 is coupled to the drain terminal of the delta first transistor T1*a* 302. A source terminal of the delta fourth transistor T4*a* 310 is coupled to the second stage and to a first end of a fifth resistor R5 328. A gate terminal of the delta fourth transistor T4*a* 310 is coupled to a second end of the fifth resistor R5 328. The second end of the fifth resistor R5 328 is coupled to a ground terminal. In one example, the second end of the fifth resistor R5 328 is coupled to a secondary voltage source.

A drain terminal of the delta fifth transistor T5*a* 312 is coupled to the drain terminal of the delta second transistor T2*a* 304. A source terminal of the delta fifth transistor T5*a* 312 is coupled to the first stage and to the first end of the fifth resistor R5 328. A gate terminal of the delta fifth transistor T5*a* 312 is coupled to the drain terminal of the delta fifth transistor T5*a* 312.

A drain terminal of the delta sixth transistor T6*a* 318 is coupled to the drain terminal of the delta third transistor T3*a* 306. A source terminal of the delta sixth transistor T6*a* 318 is coupled to the ground terminal. A gate terminal of the delta sixth transistor T6*a* 318 is coupled to the drain terminal of the delta sixth transistor T6*a* 318 and to the second generator 340.

The second generator 340 includes a first current source 358, a second current source 362, a third current source 364, a beta first transistor T1*b* 332, a beta second transistor T2*b* 334, a beta third transistor T3*b* 336, a beta fourth transistor T4*b* 338, a beta first current mirror circuit, a beta second current mirror circuit, and a beta ninth transistor T9*b* 352. The beta first current mirror circuit includes a beta fifth transistor T5*b* 342 and a beta sixth transistor T6*b* 344. The beta second current mirror circuit includes a beta seventh transistor T7*b* 346 and a beta eighth transistor T8*b* 348.

The first current source 358 is coupled to the power input terminal Vdd 301. A source terminal of the beta first transistor T1*b* 332 is coupled to the power input terminal Vdd 301. A drain terminal of the beta first transistor T1*b* 332 is coupled to the beta third transistor T3*b* 336. A gate terminal of the beta first transistor T1*b* 332 is coupled to the drain terminal of the beta first transistor T1*b* 332.

A source terminal of the beta second transistor T2*b* 334 is coupled to the power input terminal Vdd 301. A drain terminal of the beta second transistor T2*b* 334 is coupled to the third current source 364 and to the beta second current mirror circuit. A gate terminal of the beta second transistor T2*b* 334 is coupled to the gate terminals of the delta first transistor T1*a* 302, the delta second transistor T2*a* 304 and the delta sixth transistor T6*a* 306.

A source terminal of the beta third transistor T3*b* 336 is coupled to the drain terminal of beta first transistor T1*b* 332. A drain terminal of the beta third transistor T3*b* 336 is coupled to the beta first current mirror circuit and to the beta second current mirror circuit. A gate terminal of the beta third transistor T3*b* 336 is coupled to the drain terminal of the beta third transistor T3*b* 336.

A source terminal of the beta fourth transistor T4*b* 338 is coupled to the ground terminal. A drain terminal of the beta fourth transistor T4*b* 338 is coupled to the first current source 358 and to the beta first current mirror circuit. A gate terminal of the beta fourth transistor T4*b* 338 is coupled to the gate terminal of the delta sixth transistor T6*a* 318 in the first generator 320.

The beta first current mirror circuit includes the beta fifth transistor T5*b* 342 and the beta sixth transistor T6*b* 344. A source terminal of each of the beta fifth transistor T5*b* 342 and the beta sixth transistor T6*b* 344 is coupled to the ground terminal. A drain terminal of the beta fifth transistor T5*b* 342 is coupled to the first current source 358. A drain terminal of the beta sixth transistor T6*b* 344 is coupled to the beta third transistor T3*b* 336 and to the beta second current mirror circuit. A gate terminal of the beta fifth transistor T5*b* 342 is coupled to a gate terminal of the beta sixth transistor T6*b* 344. The gate terminal of the beta fifth transistor T5*b* 342 is also coupled to the drain terminal of beta fifth transistor T5*b* 342.

The beta second current mirror circuit includes the beta seventh transistor T7*b* 346 and the beta eighth transistor T8*b* 348. A source terminal of each of the beta seventh transistor T7*b* 346 and the beta eighth transistor T8*b* 348 is coupled to the ground terminal. A drain terminal of the beta seventh transistor T7*b* 346 is coupled to the beta third transistor T3*b* 336 and to the beta first current mirror circuit. A drain terminal of the beta eighth transistor T8*b* 348 is coupled to the beta second transistor T2*b* 334 and to the third current source 364. A gate terminal of the beta seventh transistor T7*b* 346 is coupled to a gate terminal of the beta eighth transistor T8*b* 348. The gate terminal of the beta eighth transistor T8*b* 348 is also coupled to the drain terminal of beta eighth transistor T8*b* 348.

The second current source 362 is coupled to the power input terminal Vdd 301. A source terminal of the beta ninth transistor T9*b* 352 is coupled to the second current source 362. A drain terminal of the beta ninth transistor T9*b* 352 is coupled to the ground terminal. A gate terminal of the beta ninth transistor T9*b* 352 is coupled to the gate terminal of the beta third transistor T3*b* 336. One end of the third current source 364 is coupled to the ground terminal.

The converter circuit 380 includes a gamma first transistor T1*c* 372, a gamma second transistor T2*c* 374, a gamma current mirror circuit, a tertiary resistor Rc 382, a first set of switches S1, S2, and a second set of switches S3, S4. The gamma current mirror circuit includes a gamma third transistor T3*c* 376 and a gamma fourth transistor T4*c* 378.

A source terminal of the gamma first transistor T1*c* 372 is coupled to the power input terminal Vdd 301. A drain terminal of the gamma first transistor T1*c* 372 is coupled to the gamma current mirror circuit. A gate terminal of the gamma first transistor T1*c* 372 is coupled to the second current source 362 and to the source terminal of the beta ninth transistor T9*b* 352.

A source terminal of the gamma second transistor T2*c* 374 is coupled to the power input terminal Vdd 301. A drain terminal of the gamma second transistor T2*c* 374 is coupled to a first end of the tertiary resistor Rc 382 through switch S1 and to a second end of the tertiary resistor Rc 382 through switch S3. A gate terminal of the gamma second transistor T2*c* 374 is coupled to the second current source 362 and to the source terminal of the beta ninth transistor T9*b* 352.

The gamma current mirror circuit includes a gamma third transistor T3*c* 376 and a gamma fourth transistor T4*c* 378. A source terminal of each of the gamma third transistor T3*c* 376 and the gamma fourth transistor T4*c* 378 is coupled to the ground terminal. A drain terminal of the gamma third transistor T3*c* 376 is coupled to the drain terminal of the gamma first transistor T1*c* 372. A drain terminal of the gamma fourth transistor T4*c* 378 is coupled to the second end of the tertiary resistor Rc 382 through switch S2 and to the first end of the tertiary resistor Rc 382 through switch S4. A gate terminal of the gamma third transistor T3*c* 376 is coupled to a gate terminal of the gamma fourth transistor T4*c* 378. The gate terminal of the gamma third transistor T3*c* 376 is also coupled to the drain terminal of the gamma third transistor T3*c* 376. The tertiary resistor Rc 382 is coupled to the gamma second transistor T2*c* 374 and to the gamma current mirror circuit.

The power source 300 may include one or more conventional components that are not described herein for brevity. Each component of the power source 300 may also be coupled to other components or blocks in FIG. 3, but those connections are not described herein for brevity. Also, each block or component of FIG. 3 may be coupled to conventional components of a system using the power source 300, which are also not shown in FIG. 3 for brevity.

In operation, the configuration of a current mirror circuit (having first and second transistors) causes a current at a drain terminal of the first transistor to be mirrored at a drain terminal of the second transistor. Accordingly, the current at the drain terminal of the delta first transistor T1*a* 302 is a first current Imn 326. This is substantially the same as the current at the drain terminal of the delta second transistor T2*a* 304 and the delta third transistor T3*a* 306.

The delta first transistor T1*a* 302, the delta second transistor T2*a* 304, and the delta third transistor T3*a* 306 are p-channel field effect transistors (PFETs). The delta fourth transistor T4*a* 310, the delta fifth transistor T5*a* 312, and the delta sixth transistor T6*a* 318 are n-channel field effect transistor (NFET).

The current at the drain terminal of the delta sixth transistor T6*a* 318 is the first current Imn 326. The first current Imn 326 varies proportional to variation in temperature.

The delta sixth transistor T6*a* 318 and the beta fourth transistor T4*b* 338 form a current mirror circuit. Accordingly, the current at the drain terminal of the delta sixth transistor T6*a* 318 is the first current Imn 326, which is substantially the same as the current at the drain terminal of the beta fourth transistor T4*b* 338.

The first generator 320 provides the first current Imn 326 to the second generator 340. The delta first transistor T1*a* 302, the delta second transistor T2*a* 302, the delta third transistor T3*a* 306 and the beta second transistor T2*b* 334 form a current mirror circuit. Thus, the current at the drain terminal of the beta second transistor T2*b* 334 is the first current Imn 326.

A current through the drain terminal of the beta fifth transistor T5*b* 342 is a tertiary current Ik 356. A current through the drain terminal of the beta eighth transistor T8*b* is a quaternary current Ik' 360. The tertiary current Ik 356 and the quaternary current Ik' 360 can be expressed as:

$$I_k = I_{z1} - I_{mn} \qquad (11)$$

$$I_k' = I_{mn} - I_{z3} \qquad (12)$$

where Iz1 is current through the first current source 358, and Iz3 is current through the third current source 364. In one version, Iz1 is equal to Iz3. In another version, Iz1 and Iz3 are equal, and both of them are equal to Iz2, which is the current generated by the second current source 362. In yet another version, Iz1 and Iz3 are equal to each other, but not equal to Iz2.

An input current Ip 354 at the drain terminal of the beta first transistor T1*b* is proportional to the tertiary current Ik 356 before temperature is equal to knee temperature. The input current Ip 354 is proportional to the quaternary current Ik' 360 after temperature crosses knee temperature. The knee temperature is a temperature at which the input current Ip 354 changes temperature dependence. At knee temperature, the first current Imn 326 crosses over the Iz1 and Iz3 currents. In one example, the knee temperature is fixed for a device using the power source 300. In another example, the first current Imn 326 and Iz1 define the knee temperature, and trimming bits are used to modulate the knee temperature. In yet another example, the knee temperature is substantially the same as room temperature. In both conditions, the input current Ip 354 is proportional to temperature because of its dependence on the secondary current In 334. This also enables the power source 300 to have minimal impact (at room temperature) on the overall noise associated with the output voltage Vout 160 when used in a voltage reference circuit, such as circuit 100 of FIG. 1.

The input current Ip 354 is provided by the second generator 340 to the converter circuit 380. A current at the drain terminal of the gamma first transistor T1*c* 372 is a correction current Io 384. The current at the drain terminal of the gamma second transistor T2*c* 374 is the correction current Io 384. Thus, the current through the tertiary resistor Rc 382 is the correction current Io 384. The first set of switches S1, S2 are closed (and the second set of switches S3, S4 are opened) when a temperature is less than the knee temperature, so a direction of the correction current Io 384 in the tertiary resistor Rc 382 is from the first end towards the second end of the tertiary resistor Rc 382. The second set of switches S3, S4 are closed (and the first set of switches S1, S2 are opened) when the temperature is greater than the knee temperature, so the direction of the correction current Io 384 in the tertiary resistor Rc 382 is from the second end towards the first end of tertiary resistor Rc 382. The correction current Io 384 can be expressed as:

$$I_o = (I_p)^2 * \left(\frac{1}{Iz2}\right) \qquad (13)$$

Thus, the correction current Io 384 is proportional to square of the input current Ip 354, and therefore proportional to square of temperature. A voltage generated across the tertiary resistor Rc 382 is a correction voltage Vcc 390. The correction voltage Vcc 390 is generated as a result of the correction current Io 384 through the tertiary resistor Rc 382. Thus, the correction voltage Vcc 390 is also proportional to square of temperature.

Thus, the power source 300 generates the correction voltage Vcc 390 which when used in the circuit 100 cancels the second and higher order temperature drifts in the output voltage Vout 160. The power source 300 generates the correction voltage Vcc 390 having equal but opposite higher order temperature drifts. At higher temperatures, the output voltage Vout 160 has an inverse curvature. The power source 300 is able to address this inverse curvature as the first generator 320 generates the first current Imn 326 that is inverse of curvature realized in the output voltage Vout 160 at higher temperatures. Thus, the first generator 320 provides high temperature curvature correction. This makes the circuit 100 useful as a voltage reference circuit. The power source 300 allows the circuit 100 to be used as a voltage reference circuit in applications where small sensed signals require very high resolution, because such circuits require precise output voltage Vout 160 with low noise. Also, the power source 300 enables the circuit 100 to achieve lower noise without increase in quiescent current, and accordingly finds application in portable or battery powered circuits, because such circuits have more stringent quiescent current requirement along with requirements of low noise.

The power source 300 avoids any requirement of a separate circuit to address the second and higher order temperature drift correction in the output voltage Vout 160. The power source 300 tracks process variations. In addition, the power source 300 has minimal impact on noise performance of the circuit 100, and consumes ultra-low current. This is enabled by the first generator 320 used in the power source 300. If the first generator 320 is not used in the power source 300 for higher temperature curvature correction, then either the width of the third transistor T3 122 (in FIG. 1) is to be reduced (which increases noise) or a resistance of the primary resistor Rp 132 is to be reduced (which increases the quiescent current of the circuit 100). Applications such as environmental sensors and medical applications can use circuit 100 (with power source 300) as a voltage reference, because it provides low temperature drift even at higher temperatures and accordingly increases accuracy of such systems across a temperature range.

Figure 4:
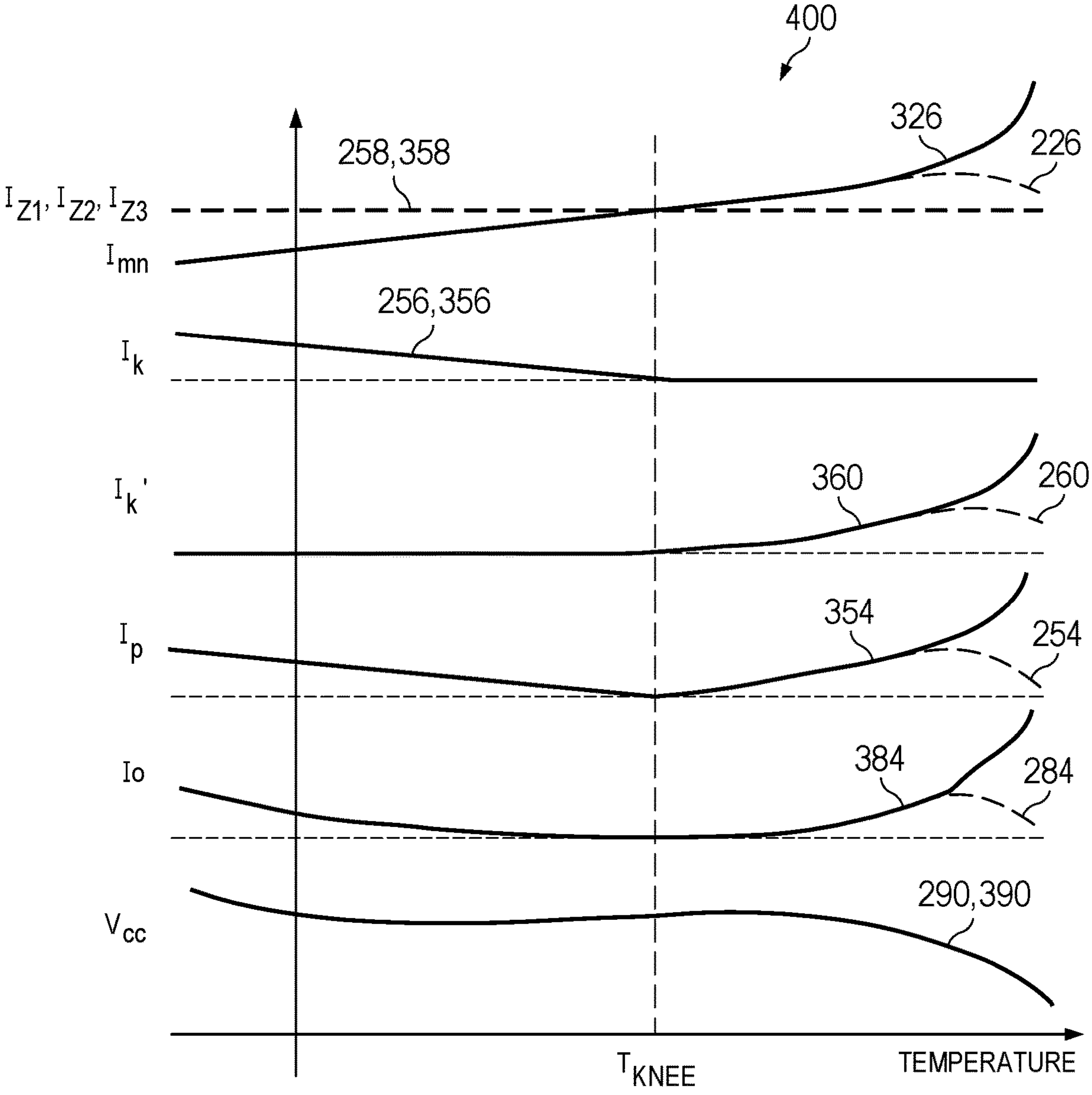
FIG. 4 is a waveform diagram of operation of the power sources of FIG. 2 and FIG. 3, according to an embodiment.

FIG. 4 is a waveform diagram 400 of operation of the power sources of FIG. 2 and FIG. 3, according to an embodiment. The waveform diagram 400 is explained in connection with the power source 200 of FIG. 2 and the power source 300 of FIG. 3. The waveform diagram shows the current Iz1 through the first current source 258. In one version, Iz1 and Iz3 are equal to Iz. The waveform diagram 400 also shows the first current Imn 226, the tertiary current Ik 256, the quaternary current Ik' 260, the input current Ip 254, the correction current Io 284 and the correction voltage Vcc 290. For power source 300, the waveform diagram 400 also shows the first current Imn 326, the tertiary current Ik 356, the quaternary current Ik' 360, the input current Ip 354, the correction current Io 384 and the correction voltage Vcc 390. The waveforms are represented as a function of temperature.

In the waveform diagram 400, as an example, the current (Iz1) through the first current source 258, the current (Iz2) through the second current source 262, and the current (Iz3) through the third current source 264 are equal to a constant value. The first generator 220 provides the first current Imn 226 to the second generator 240. The first current Imn 226 can be expressed as:

$$I_{mn}=I_n-I_m \tag{14}$$

where Im 222 is the primary current at the drain terminal of the alpha first transistor T1*a* 202, and In 224 is the secondary current at the source terminal of the alpha seventh transistor T7*a* 214.

The secondary current In 224 varies proportional to variation in temperature. Accordingly, the first current Imn 226, as expressed in waveform diagram 400, varies proportional to temperature. The first current Imn 326, as expressed in waveform diagram 400, is also proportional to the temperature. But Imn 326 increases at higher temperatures, whereas Imn 226 decreases at higher temperatures.

A current through the drain terminal of the beta fifth transistor T5*b* 242 is the tertiary current Ik 256. A current through the drain terminal of the beta eighth transistor T8*b* is the quaternary current Ik' 260. The tertiary current Ik 256 and the quaternary current Ik' 260 can be expressed as:

$$I_k=I_{z1}-I_{mn} \tag{15}$$

$$I_k'=I_{mn}I_{z3} \tag{16}$$

where Iz1 is current through the first current source 258, and Iz3 is current through the third current source 264. In one version, Iz1 is equal to Iz3. In another version, Iz1 and Iz3 are equal, and both of them are equal to Iz2, which is the current generated by the second current source 262. In yet another version, Iz1 and Iz3 are equal to each other, but not equal to Iz2. Thus, the tertiary current Ik 256, as expressed in the waveform diagram 400, decreases linearly with increase in temperature up to Tknee, where Tknee is a temperature at which the input current Ip 254 changes temperature dependence. Similar waveform is noted for the tertiary current Ik 356 in the power source 300. Also, the quaternary current Ik' 260, as expressed in the waveform diagram 400, follows Iz before knee temperature and follows the first current Imn 226 after knee temperature Tknee. The quaternary current Ik' 360, as expressed in the waveform diagram 400, follows Iz before knee temperature and follows the first current Imn 326 after knee temperature Tknee.

The input current Ip 254 at the drain terminal of the beta first transistor T1*b* 232 is proportional to the tertiary current Ik 256 before temperature is equal to knee temperature Tknee. The input current Ip 254 is proportional to the quaternary current Ik' 260 after temperature crosses knee temperature Tknee. In one example, the knee temperature Tknee is substantially the same as room temperature. In both conditions, the input current Ip 254 is proportional to temperature because of its dependence on the secondary current In 224. This also enables the power source 200 to have minimal impact on the overall noise when used in a voltage reference circuit, such as circuit 100 of FIG. 1. Similarly, the input current Ip 354 at the drain terminal of the beta first transistor T1*b* 332 is proportional to the tertiary current Ik 356 before temperature is equal to knee temperature Tknee. The input current Ip 354 is proportional to the quaternary current Ik' 360 after temperature crosses knee temperature Tknee The input current Ip 254 is provided by the second generator 240 to the converter circuit 280. A current at the drain terminal of the gamma first transistor T1*c* 272 is the correction current Io 284. The current at the drain terminal of the gamma second transistor T2*c* 274 is the correction current Io 284. Thus, the current through the tertiary resistor Rc 282 is the correction current Io 284. The correction current Io 284 can be expressed as:

$$I_o=(I_p)^2*\left(\frac{1}{Iz2}\right) \tag{17}$$

Thus, the correction current Io 284 is proportional to square of the input current Ip 254, and therefore proportional to square of temperature, as expressed in the waveform diagram 400.

The voltage generated across the tertiary resistor Rc 282 is a correction voltage Vcc 290. The correction voltage Vcc 290 is generated as a result of the correction current Io 284 through the tertiary resistor Rc 282. Thus, the correction voltage Vcc 290 (and the correction voltage Vcc 390), as expressed in the waveform diagram 400, is also proportional to square of temperature.

Thus, the power source 200 generates the correction voltage Vcc 290 which when used in the circuit 100 cancels the second order and higher order temperature drifts in the output voltage Vout 160. The power source 200 generates the correction voltage Vcc 290 having equal but opposite higher order temperature drifts. At higher temperatures, the output voltage Vout 160 has an inverse curvature. The power source 200 is able to address this inverse curvature as the first generator 220 generates the first current Imn 226 that is inverse of curvature realized in the output voltage Vout 160 at higher temperatures. Thus, the first generator 220 provides high temperature curvature correction. This makes the circuit 100 useful as a voltage reference circuit. The power source 200 allows the circuit 100 to be used as a voltage reference circuit in applications where small sensed signals require very high resolution, because such circuits require precise output voltage Vout 160 with low noise. Also, the power source 200 enables the circuit 100 to achieve lower noise without increase in quiescent current, and accordingly finds application in portable or battery powered circuits, because such circuits have more stringent quiescent current requirement along with requirements of low noise. These features are applicable to power source 300 as well.

Figure 5:
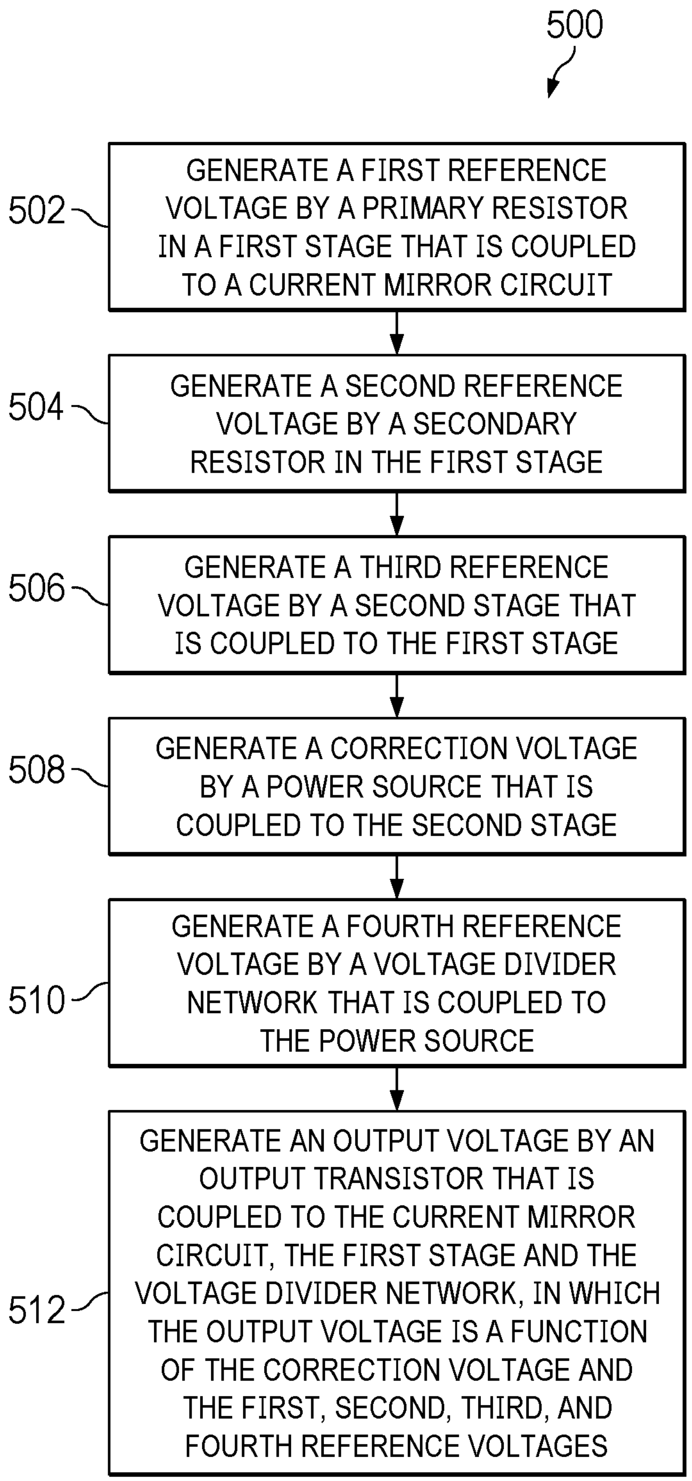
FIG. 5 is a flowchart of a method of operation of a circuit, according to an embodiment.

FIG. 5 is a flowchart 500 of a method of operation of a circuit, according to an embodiment. The flowchart 500 is described in connection with the circuit 100 of FIG. 1. The flowchart starts at step 502 and ends at step 512. At step 502, a first reference voltage is generated by a primary resistor in a first stage. The first stage is coupled to the current mirror circuit. In circuit 100, for example, the current mirror circuit 102 is coupled to a power input terminal Vdd 110. The power input terminal Vdd 110 receives the power supply. The first stage 120 and the second stage 140 are coupled to the current mirror circuit 102. The current mirror circuit 102 includes a first transistor T1 104 and a second transistor T2 108. The first stage 120 includes a third transistor T3 122. The third transistor T3 122 is coupled to the current mirror circuit 102. A first end of a primary resistor Rp 132 is coupled to the source terminal of the third transistor T3 122, and a second end of the primary resistor Rp 132 is coupled to the gate terminal of the third transistor T3 122. A voltage (VsgNAT) generated across the primary resistor Rp 132 is the first reference voltage.

At step 504, a second reference voltage is generated by a secondary resistor in the first stage. In circuit 100, the secondary resistor Rs 134, having first and second ends, is coupled to the primary resistor Rp 132. The first end of the secondary resistor Rs 134 is coupled to the second end of the primary resistor Rp 132. The second end of the secondary resistor Rs 134 is coupled to a ground terminal. The voltage (Vptat) generated across the secondary resistors Rs 134 is the second reference voltage.

At step 506, a third reference voltage is generated by a second stage that is coupled to the first stage. The second stage 140 includes the fourth transistor T4 142. A drain terminal of the fourth transistor T4 142 is coupled to the second transistor T2 108 in the current mirror circuit 102, and a gate terminal of the fourth transistor T4 142 is coupled to the power source 144. A source terminal of the fourth transistor T4 142 is coupled to a source terminal of the third transistor T3 122. In one version, both the first stage 120 and the second stage 140 include multiple transistors. The voltage (VgsSVT) generated across the fourth transistor T4 142 is the third reference voltage.

A correction voltage is generated by a power source that is coupled to the second stage, at step 508. In circuit 100, for example, the power source 144 is coupled to the second stage 140. The gate terminal of the fourth transistor T4 142 is coupled to the power source 144. The correction voltage Vcc is generated across the power source 144.

At step 510, a fourth reference voltage is generated by a voltage divider network that is coupled to the power source. In circuit 100, the voltage divider network 150 includes a first resistor R1 152 and a second resistor R2 154. A first end of the first resistor R1 152 is coupled to the drain terminal of the output transistor T0 158, and a second end of the first resistor R1 152 is coupled to the second resistor R2 154 and to the power source 144. A first end of the second resistor R2 154 is coupled to the first resistor R1 152 and to the power source 144. A second end of the second resistor R2 154 is coupled to the ground terminal. The voltage (Vscale) generated across the first resistor R1 152 in the voltage divider network 150 is the fourth reference voltage.

At step 512, an output voltage is generated by an output transistor that is coupled to the current mirror circuit, the first stage and the voltage divider network. The output voltage is a function of the correction voltage and the first, second, third and fourth reference voltages. In circuit 100, the output transistor T0 158 is coupled to the first stage 120, the current mirror circuit 102 and the voltage divider network 150. A gate terminal of the output transistor T0 158 is coupled to the drain terminal of the third transistor T3 122 in the first stage 120 and to the drain terminal of the first transistor T1 104 in the current mirror circuit 102. A source terminal of the output transistor T0 158 is coupled to the power input terminal Vdd 110. A drain terminal of the output transistor T0 158 is coupled to the voltage divider network 150. The output voltage Vout 160 is generated at the drain terminal of the output transistor T0 158.

The output voltage Vout 160 is a function of the first reference voltage (VsgNAT), the second reference voltage (Vptat), the third reference voltage (VgsSVT), the correction voltage (Vcc) and the fourth reference voltage (Vscale). The output voltage Vout 160 is expressed as:

$$V_{out}=V_{sgNAT}+V_{ptat}+V_{gsSVT}+V_{cc}+V_{scale} \tag{18}$$

The method of flowchart 500 enables a circuit to effectively cancel the second order and higher order temperature drifts in the output voltage Vout 160. The power source 144 generates the correction voltage Vcc that is proportional to a factor of temperature. In one example, the power source 144 generates the correction voltage Vcc that is proportional to temperature squared. The voltage (Vptat) generated across the secondary resistors Rs 134 controls a first order temperature drift in the output voltage Vout 160.

The method of flowchart 500 makes the circuit useful as a voltage reference circuit. The circuit, such as the circuit 100, is useful as a voltage reference circuit in applications where small sensed signals require very high resolution, because such circuits require precise output voltage Vout 160 with low noise. Also, the method enables the circuit to achieve lower noise without increase in quiescent current, and accordingly is useful in portable or battery powered applications, because such circuits have more stringent quiescent current requirement along with requirements of low noise.

Figure 6:
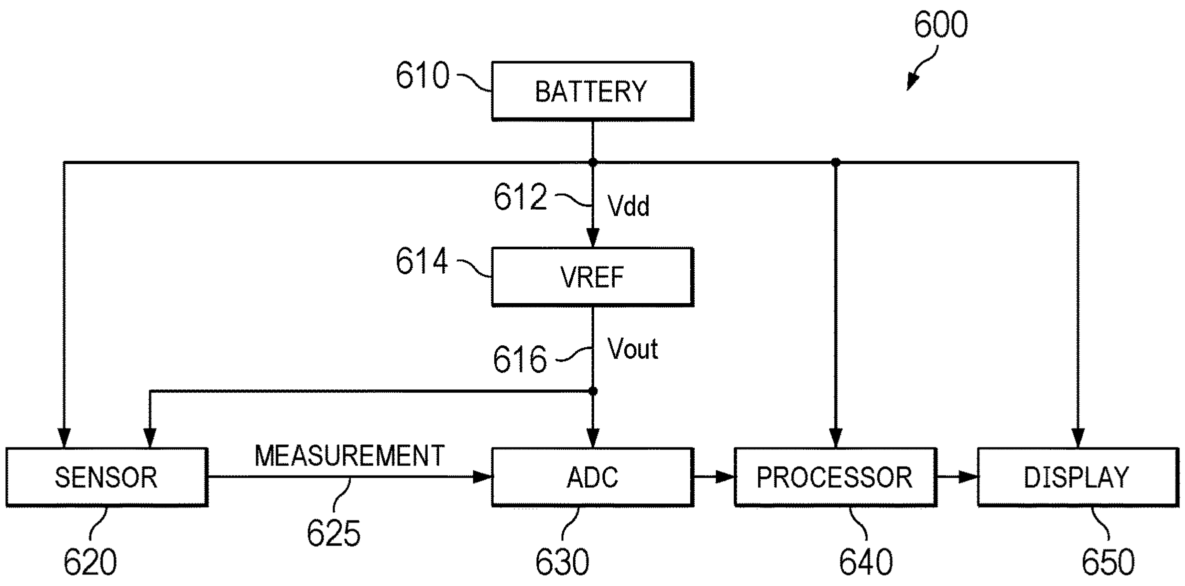
FIG. 6 is a block diagram of an example device including aspects of example embodiments.

FIG. 6 is a block diagram of an example device 600 including aspects of example embodiments. The device 600 is, or is incorporated into or is part of, a server farm, a vehicle, a communication device, a transceiver, a personal computer, a gaming platform, a computing device, any other type of electronic system, or a portable device such as a battery powered handheld measurement device. The device

600 may include one or more conventional components that are not described herein for brevity.

The device 600 includes a battery 610, a voltage reference circuit Vref 614, a sensor 620, an analog to digital converter (ADC) 630 and a display 650. The processor 640 can be a CISC-type CPU (complex instruction set computer), a RISC-type CPU (reduced instruction set computer), a digital signal processor (DSP), a microprocessor, a CPLD (complex programmable logic device), or an FPGA (field programmable gate array). The battery 610 is configured to provide power supply Vdd 612 to the voltage reference circuit Vref 614, a sensor 620, a processor 640 and a display 650.

The voltage reference circuit Vref 614 is similar, in connection and operation, to the circuit 100 of FIG. 1. Similar to circuit 100, the voltage reference circuit Vref 614 includes a current mirror circuit, a first stage, a second stage, a power source, a voltage divider network and an output transistor. The voltage (VsgNAT) generated across a primary resistor in the first stage is a first reference voltage, and the voltage (Vptat) generated across a secondary resistor in the first stage is a second reference voltage. The voltage (VgsSVT) generated across a fourth transistor in the second stage is a third reference voltage. The voltage (Vscale) generated across a first resistor in the voltage divider network is a fourth reference voltage. The correction voltage Vcc across the power source. The output voltage Vout is generated at the output transistor. The output voltage Vout is a function of the first reference voltage (VsgNAT), the second reference voltage (Vptat), the third reference voltage (VgsSVT), the correction voltage (Vcc) and the fourth reference voltage (Vscale).

The voltage reference circuit Vref 614 provides an accurate and stable output voltage Vout 616 for use by the sensor 620 and an ADC 630, which may be required for small signal measurements. If the device 600 is handheld and battery powered, then the relatively low Iq provided by the voltage reference circuit Vref 614 is also beneficial. The sensor 620 generates an analog measurement signal 625, which is converted into a digital signal by ADC 630 to be supplied to the processor 640. The processor 640 may then manipulate the signal by performing any suitable signal processing functions, such as averaging, filtering, etc., and then provide results to be displayed on the display 650.

The output voltage Vout 616 includes higher order temperature drifts. The voltage reference circuit Vref 614 includes the power source, similar to the power source 200 or the power source 300, that generates the correction voltage Vcc having equal but opposite higher order temperature drifts. The correction voltage Vcc cancels the temperature drifts in the output voltage Vout 616. Even when the sensor 620 generates small sense signals that require higher resolution, the voltage reference circuit Vref 614 generates precise output voltage Vout 616 with low noise. When the sensor 620 is an environmental sensor or a medical application sensor, the voltage reference circuit Vref 614 provides a precise output voltage Vout 616, thereby increasing the accuracy of the device 600 as the voltage reference circuit Vref 614 corrects temperature drift in the output voltage Vout 616.

Figure 7:
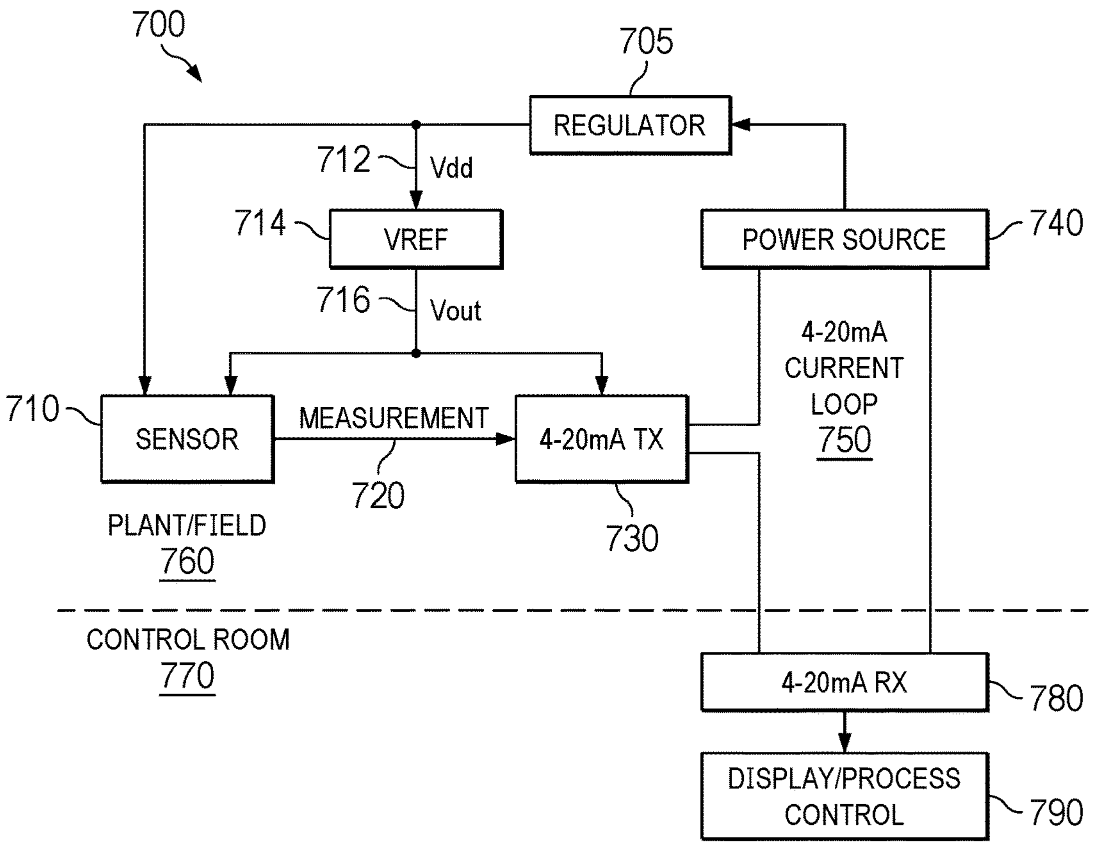
FIG. 7 illustrates another example application of the circuit of FIG. 1, in accordance with an embodiment.

FIG. 7 illustrates another example application 700 of the circuit of FIG. 1, in accordance with an embodiment. This example shows an industrial plant process monitoring application in which a processing condition is monitored by a sensor 710, located in the plant or field 760, and the sensor measurements 720 are transmitted back to a control room 770. The measurements are transmitted using a 4-20 mA current loop 750 in which the message is encoded in a current signal that ranges from 4 milliamps (mA) to 20 mA. A power source 740 is configured to provide power to a voltage regulator 705, which is configured to provide a power supply Vdd 712 to a voltage reference circuit Vref 714 and to the sensor 710.

The voltage reference circuit Vref 714 is similar, in connection and operation, to the circuit 100 of FIG. 1. Similar to circuit 100, the voltage reference circuit Vref 714 includes a current mirror circuit, a first stage, a second stage, a power source, a voltage divider network and an output transistor. The voltage (VsgNAT) generated across a primary resistor in the first stage is a first reference voltage, and the voltage (Vptat) generated across a secondary resistor in the first stage is a second reference voltage. The voltage (VgsSVT) generated across a fourth transistor in the second stage is a third reference voltage. The voltage (Vscale) generated across a first resistor in the voltage divider network is a fourth reference voltage. The correction voltage Vcc across the power source. The output voltage Vout is generated at the output transistor. The output voltage Vout is a function of the first reference voltage (VsgNAT), the second reference voltage (Vptat), the third reference voltage (VgsSVT), the correction voltage (Vcc) and the fourth reference voltage (Vscale).

The voltage reference circuit Vref 714 provides an accurate and stable output voltage Vout 716 for use by the sensor 710 and the 4-20 mA signal transmitter 730. The power source 740 is configured to provide a coarse voltage that drives the 4-20 mA current loop 750, while the 4-20 mA signal transmitter 730 is configured to modulate the current flow through the 4-20 mA current loop 750 with relatively high accuracy.

On the control room side 770, a 4-20 mA receiver 780 is configured to decode the message from the received current in the 4-20 mA current loop 750. The decoded message, which represents the sensor measurement 720, is then provided to a display or process controller 770 for further control of the industrial process.

The output voltage Vout 716 includes higher order temperature drifts. The voltage reference circuit Vref 714 includes the power source, similar to the power source 200 or the power source 300, that generates the correction voltage Vcc having equal but opposite higher order temperature drifts. The correction voltage Vcc cancels the temperature drifts in the output voltage Vout 716. Even when the sensor 710 generates small sense signals that require higher resolution, the voltage reference circuit Vref 714 generates precise output voltage Vout 716 with low noise. When the sensor 710 is an environmental sensor or a medical application sensor, the voltage reference circuit Vref 714 provides a precise output voltage Vout 716, thereby increasing the accuracy of the device 700 as the voltage reference circuit Vref 714 corrects temperature drift in the output voltage Vout 716.

In this description, unless otherwise stated, "about," "approximately" or "substantially" preceding a parameter means being within +/−10 percent of that parameter.

Modifications are possible in the described embodiments, and other embodiments are possible, within the scope of the claims.

What is claimed is:

1. A circuit comprising:

a first stage;

a second stage coupled to the first stage;

a current mirror circuit including:

a first transistor having first, second and third terminals, in which the first terminal of the first transistor is coupled to a power input terminal, and the second terminal of the first transistor is coupled to the first stage; and a second transistor having first, second and third terminals, in which the first terminal of the second transistor is coupled to the power input terminal, the second terminal of the second transistor is coupled to the second stage, and the third terminal of the second transistor is coupled to the third terminal of the first transistor and to the second terminal of the second transistor; and an output transistor coupled to the first stage and to the current mirror circuit;

a voltage divider network coupled to the output transistor; and a power source coupled to the second stage and to the voltage divider network.

2. The circuit of claim 1, wherein the power source is configured to generate a correction voltage proportional to a factor of temperature.

3. The circuit of claim 1, wherein the first stage includes:

a third transistor having first, second and third terminals, in which the second terminal of the third transistor is coupled to the current mirror circuit, and the first terminal of the third transistor is coupled to the second stage;

a primary resistor having first and second ends, in which the first end of the primary resistor is coupled to the first terminal of the third transistor and to the second stage, and the second end of the primary resistor is coupled to a third terminal of the third transistor; and a secondary resistor having first and second ends, in which the first end is coupled to the second end of the primary resistor and to the third terminal of the third transistor, and the second end is coupled to a ground terminal.

4. The circuit of claim 3, wherein the second stage includes a fourth transistor having first, second and third terminals, the first terminal of the fourth transistor is coupled to the third transistor and to the primary resistor in the first stage, and the second terminal of the fourth transistor is coupled to the current mirror circuit.

5. The circuit of claim 4, wherein the output transistor has:

a first terminal coupled to the power input terminal;

a second terminal coupled to the voltage divider network; and a third terminal coupled to the first and third transistors.

6. The circuit of claim 5, wherein the voltage divider network includes:

a first resistor coupled between the second terminal of the output transistor and the power source; and a second resistor coupled to the power source, to the first resistor and to the ground terminal.

7. The circuit of claim 6, wherein the power source is coupled between the third terminal of the fourth transistor and the first resistor in the voltage divider network, and the power source is configured to generate a correction voltage proportional to temperature squared.

8. The circuit of claim 7, wherein the output transistor is configured to generate an output voltage at the second terminal of the output transistor, and the output voltage is a function of: a voltage across the primary resistor; a voltage across the secondary resistor; a voltage across the fourth transistor; the correction voltage; and a voltage across the first resistor.

9. The circuit of claim 8, wherein the power source includes:

a first generator configured to generate a first current;

a second generator configured to receive the first current and to generate an input current; and a converter circuit configured to receive the input current and to generate the correction voltage.

10. The circuit of claim 9, wherein the first generator includes:

a delta current mirror circuit coupled to the power input terminal;

a delta first stage coupled to the delta current mirror circuit;

a delta second stage coupled to the delta first stage and to the delta current mirror circuit; and a delta sixth transistor having first, second and third terminals, in which the first terminal is coupled to the ground terminal, and the second terminal is coupled to the delta current mirror circuit.

11. The circuit of claim 9, wherein the first generator includes:

an alpha first current mirror circuit coupled to the power input terminal;

an alpha first stage coupled to the alpha first current mirror circuit;

an alpha second stage coupled to the alpha first stage and to the alpha first current mirror circuit;

an alpha second current mirror circuit coupled to the power input terminal;

an alpha seventh transistor having first, second and third terminals, in which the first terminal is coupled to the alpha second current mirror circuit, and the third terminal is coupled to the ground terminal; and an alpha ninth transistor having first, second and third terminals, in which the first terminal is coupled to the ground terminal, and the second terminal is coupled to the alpha second current mirror circuit.

12. The circuit of claim 11, wherein the second generator includes:

first and second current sources coupled to the power input terminal;

a beta first transistor having first, second and third terminals, in which the first terminal is coupled to the power input terminal, and the second terminal is coupled to the third terminal;

a beta second transistor having first, second and third terminals, in which the first terminal is coupled to the power input terminal, and the third terminal is coupled to the alpha second current mirror circuit;

a beta third transistor having first, second and third terminals, in which the first terminal is coupled to the beta first transistor, and the second terminal is coupled to the third terminal;

a beta fourth transistor having first, second and third terminals, in which the second terminal is coupled to the first current source, and the third terminal is coupled to the alpha ninth transistor;

a beta first current mirror circuit coupled to the first current source and to the beta third transistor;

a beta second current mirror circuit coupled to the beta second and beta third transistors;

a beta ninth transistor having first, second and third terminals, in which the first terminal is coupled to the second current source, and the third terminal is coupled to the beta third transistor; and a third current source coupled to the beta second transistor and to the beta second current mirror circuit.

13. The circuit of claim 12, wherein the converter circuit includes:

a gamma first transistor having first, second and third terminals, in which the first terminal is coupled to the power input terminal, and the third terminal is coupled to the second current source;

a gamma second transistor having first, second and third terminals, in which the first terminal is coupled to the power input terminal, and the third terminal is coupled to the second current source;

a gamma current mirror circuit coupled to the gamma first transistor; and a tertiary resistor coupled to the gamma second transistor and to the gamma current mirror circuit, wherein the correction voltage is generated across the tertiary resistor.

14. A method comprising:

generating a first reference voltage by a primary resistor in a first stage that is coupled to a current mirror circuit;

generating a second reference voltage by a secondary resistor in the first stage;

generating a third reference voltage by a second stage including a first transistor that is coupled to the first stage;

generating a correction voltage by a power source that is coupled to the second stage and the first transistor;

generating a fourth reference voltage by a voltage divider network that is coupled to the power source; and generating an output voltage by an output transistor that is coupled to the current mirror circuit, the first stage and the voltage divider network, in which the output voltage is a function of the correction voltage and the first, second, third and fourth reference voltages.

15. The method of claim 14, wherein generating the correction voltage comprises:

generating a first current by a first generator;

generating an input current by a second generator responsive to the first current from the first generator; and generating a correction current by a converter circuit responsive to the input current from the second generator, in which the correction current is proportional to temperature squared.

16. The method of claim 14, wherein generating the first reference voltage and the second reference voltage by the first stage includes:

coupling a power input terminal to the current mirror circuit;

coupling a second transistor to the current mirror circuit;

coupling the primary resistor to the second transistor; and coupling the secondary resistor to the primary resistor.

17. The method of claim 16, wherein generating the third reference voltage by the second stage includes:

coupling the power input terminal to the current mirror circuit; and coupling the first transistor to the current mirror circuit.

18. The method of claim 17, wherein generating the fourth reference voltage includes:

coupling a first resistor in the voltage divider network to the output transistor and to the power source; and coupling a second resistor to the first resistor and to a ground terminal.

19. The method of claim 18, wherein generating the output voltage by the output transistor includes:

coupling a first terminal of the output transistor to the power input terminal;

coupling a third terminal of the output transistor to the current mirror circuit and to the first stage; and coupling a second terminal of the output transistor to the voltage divider network, in which the output voltage is generated at the second terminal of the output transistor.

20. A device comprising:

a voltage reference circuit configured to provide an output voltage based on power at a power input terminal;

a sensor coupled to the voltage reference circuit, the sensor configured to be driven by the output voltage and to provide an analog measurement signal; and an analog to digital converter (ADC) coupled to the voltage reference circuit and to the sensor, the ADC configured to be driven by the output voltage and to convert the analog measurement signal into a digital signal;

in which the voltage reference circuit includes:

a first stage;

a second stage coupled to the first stage;

a current mirror circuit coupled to the first stage and the second stage, the current mirror circuit including:

a first transistor having first, second and third terminals, in which the first terminal of the first transistor is coupled to a power input terminal, and the second terminal of the first transistor is coupled to the first stage; and a second transistor having first, second and third terminals, in which the first terminal of the second transistor is coupled to the power input terminal, the second terminal of the second transistor is coupled to the second stage, and the third terminal of the second transistor is coupled to the third terminal of the first transistor and to the second terminal of the second transistor;

a voltage divider network coupled to the second stage;

an output transistor coupled to the first stage and the voltage divider network; and a power source coupled to the second stage and to the voltage divider network.

* * * * *